(12) United States Patent
Aldrich

(10) Patent No.: US 9,599,153 B2
(45) Date of Patent: Mar. 21, 2017

(54) BEARING ASSEMBLY AND METHOD

(71) Applicant: Ergotron, Inc., St. Paul, MN (US)

(72) Inventor: Stuart Ripley Aldrich, North Bennington, VT (US)

(73) Assignee: Ergotron, Inc., St. Paul, MN (US)

( * ) Notice: Subject to any disclaimer, the term of this patent is extended or adjusted under 35 U.S.C. 154(b) by 0 days.

(21) Appl. No.: 14/955,612

(22) Filed: Dec. 1, 2015

(65) Prior Publication Data

US 2016/0160916 A1 Jun. 9, 2016

Related U.S. Application Data

(60) Provisional application No. 62/087,215, filed on Dec. 3, 2014.

(51) Int. Cl.
*F16C 29/06* (2006.01)
*F16C 29/00* (2006.01)
(Continued)

(52) U.S. Cl.
CPC ........ *F16C 29/0633* (2013.01); *F16C 29/001* (2013.01); *F16C 29/008* (2013.01);
(Continued)

(58) Field of Classification Search
CPC .. F16C 29/0633; F16C 29/001; F16C 29/008; F16C 29/0602; F16C 29/0614; F16C 29/0616; F16M 11/28; B23Q 1/0063
(Continued)

(56) References Cited

U.S. PATENT DOCUMENTS 2,681,836 A 6/1954 Jarund
2,998,286 A 8/1961 Jarund
(Continued)

FOREIGN PATENT DOCUMENTS

DE 866278 C 2/1953
GB 2114251 A 8/1983

OTHER PUBLICATIONS

"International Application Serial No. PCT/US2015/063167, International Search Report mailed Feb. 19, 2016", 4 pgs.
(Continued)

*Primary Examiner* — Todd M Epps
(74) *Attorney, Agent, or Firm* — Schwegman Lundberg & Woessner, P.A.

(57) ABSTRACT

A bearing assembly can comprise: a base member including at least one base ramp; a carriage member including: a first surface defining a bearing channel, the bearing channel configured to receive a plurality of ball bearings and allow recirculating movement of the ball bearings, the bearing channel having a variable depth, wherein the bearing channel having a variable depth is configured to allow the plurality of ball bearings to extend beyond the first surface at a first portion of the bearing channel and extend below the first surface at a second portion of the bearing channel; a second surface opposing the first surface, the second surface including at least one carriage ramp, the carriage ramp configured to engage the at least one base ramp; and a retaining member configured to cover a least a portion of the first surface and retain the ball bearings in the carriage member.

21 Claims, 12 Drawing Sheets

(51) Int. Cl.
*F16C 43/02* (2006.01)
*F16M 11/28* (2006.01)
*F16C 29/12* (2006.01)

(52) U.S. Cl.
CPC ...... *F16C 29/0602* (2013.01); *F16C 29/0614* (2013.01); *F16C 29/0616* (2013.01); *F16C 29/126* (2013.01); *F16C 43/02* (2013.01); *F16M 11/28* (2013.01); *F16C 29/0607* (2013.01)

(58) Field of Classification Search
USPC .................. 248/188.5; 384/43; 29/898.03
See application file for complete search history.

(56) References Cited

U.S. PATENT DOCUMENTS

| | | | |
|---|---|---|---|
| 3,564,970 A | | 2/1971 | Larsen |
| 3,951,471 A | | 4/1976 | Langenstein |
| 4,231,621 A | | 11/1980 | Teramachi |
| 4,278,306 A | | 7/1981 | Douglas et al. |
| 4,557,530 A | | 12/1985 | Haase |
| 4,645,391 A | | 2/1987 | Fallert |
| 4,655,612 A | | 4/1987 | Lunz et al. |
| 4,662,762 A | | 5/1987 | Schwarz |
| 4,730,944 A | | 3/1988 | Fiak et al. |
| 4,730,945 A | * | 3/1988 | Luther ................ B23Q 1/0063 384/44 |
| 4,940,339 A | | 7/1990 | Amano |
| 4,957,376 A | | 9/1990 | Ward, Jr. |
| 5,004,203 A | | 4/1991 | Fabius |
| 8,382,842 B2 | | 2/2013 | Greenhalgh et al. |
| 2016/0270525 A1 | * | 9/2016 | Aldrich ................ F16M 11/42 |

OTHER PUBLICATIONS

"International Application Serial No. PCT/US2015/063167, Written Opinion mailed Feb. 19, 2016", 8 pgs.

"3D printed recirculating carriage", you tube video, [Online]. Retrieved from the Internet: <URL: https://www.youtube.com/watch?v=UTxivqmK4s0, (Apr. 17, 2014), 2:04.

"Ball Bearing Gib Assembly—Series GSP—Ball Bearing Gibs", [Online]. Retrieved from the Internet <URL: http://turnomat.com/quality-products/ball-bearing-gib-assembly/, (2012), 2 pgs.

"Ball Bearing Traveller System—Series 14MM, Cars", Ronstan, [Online]. Retrieved from the Internet <URL: http://www.ronstan.us/marine5/range.asp?RnID=038a, (Accessed Nov. 11, 2015), 2 pgs.

"Linear Bearing: How does it work?", Mechanical Components, [Online]. Retrieved from the Internet: <URL: http://mechanical-components.com/linear-bearings/, (Feb. 24, 2013), 1 pg.

"Modernizing Automation within the Food and Beverage Industry", Machine Design, [Online]. Retrieved from the Internet: <URL: http://machinedesign.com/archive/segmented-bearings-overcomelimitations-conventional-geometry, (2015), 2 pgs.

Dalessandro, Frank, "Segmented Bearing Technology Tackles Conventional Geometry Limitations", Industrial Equipment News, [Online]. Retrieved from the Internet: <URL: http://www.ien.com/article/segmented-bearing-technology/876, (2013), 3 pgs.

* cited by examiner

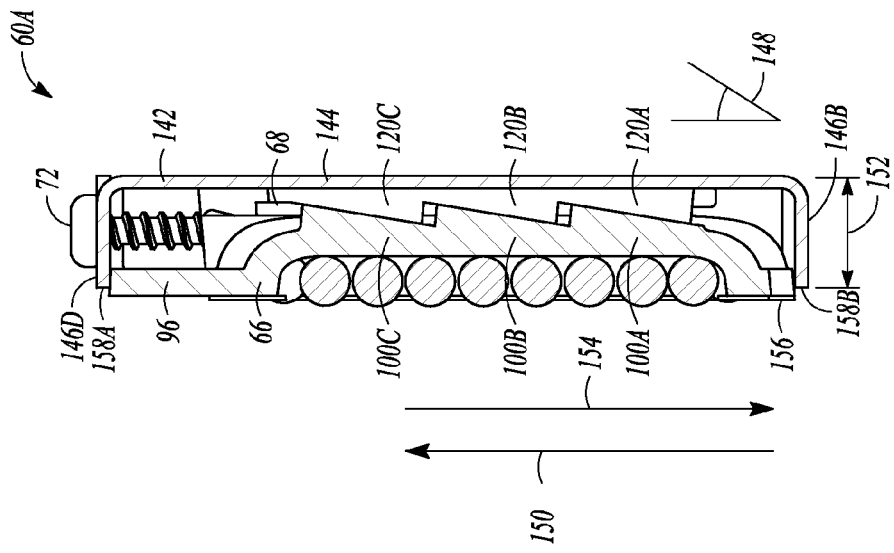
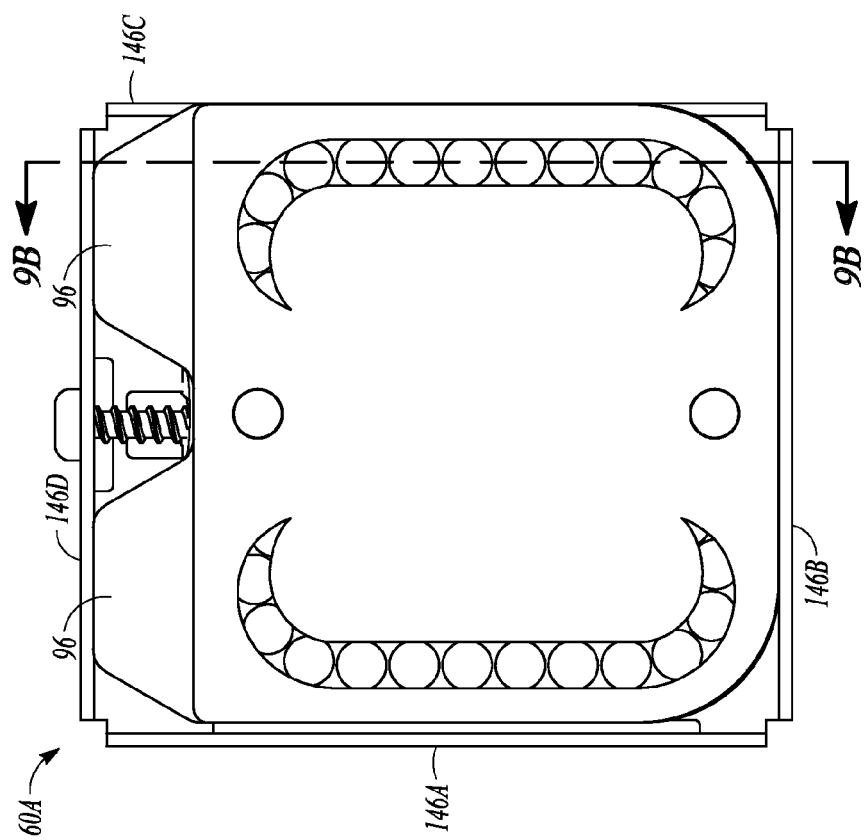

BEARING ASSEMBLY AND METHOD

CLAIM OF PRIORITY

This patent application claims the benefit of priority of U.S. Provisional Patent Application Ser. No. 62/087,215 to Stuart Aldrich, titled "HEIGHT ADJUSTABLE FURNITURE SUPPORT" and filed on Dec. 3, 2014, which is hereby incorporated by reference herein in its entirety.

TECHNICAL FIELD

This disclosure generally relates to a bearing assembly for use in height adjustable devices.

BACKGROUND

Bearing assemblies can be used in locations where two moving parts come into contact with each other. Bearing assemblies can be used on sliding surfaces to reduce friction between the parts and prevent wear of the parts. Bearing assemblies can be used in lift mechanisms in height adjustable devices and can be located between parts that move relative to each other.

SUMMARY

The present inventor has recognized a need for a bearing assembly of the recirculating bearing type that can be used in height adjustable devices that can be inexpensive and easy to assemble. The disclosed bearing assembly and method can be manufactured from a wide range of materials including polymers, plastics, hard rubbers, metals, and composites of the aforementioned materials. The bearing assembly can include a retaining member formed of a flexible film that can be adhered to a carriage member before any rolling elements ("balls") have been inserted into the carriage member. The retaining member can define an opening over a portion of a bearing channel that can have a width that is smaller than the diameter of the balls. The balls can be pushed through the opening and the flexible film can spring back into a planar formation that will retain the balls in the bearing channel.

The bearing assembly can include a base member that can have complementary ramp shapes that mate with ramp shapes in the underside of the carriage member. An adjustment member can move the base member relative to the carriage member and can provide a total width adjustment for the bearing assembly. The bearing assembly can be located on telescoping members of a telescoping leg assembly and provide reduced friction and wear protection between moving members of the telescoping leg assembly.

To further illustrate the BEARING AND METHOD disclosed herein, a non-limiting list of examples is provided here:

In Example 1, a bearing assembly can comprise: a base member including at least one base ramp; a carriage member including: a first surface defining a first bearing channel, the first bearing channel configured to receive a first plurality of ball bearings and allow recirculating movement of the plurality of ball bearings around the first bearing channel, the first bearing channel having a variable depth, wherein the first bearing channel having a variable depth is configured to allow the first plurality of ball bearings to extend beyond the first surface at a first portion of the first bearing channel and extend below the first surface at a second portion of the first bearing channel; a second surface opposing the first surface, the second surface including at least one carriage ramp, the carriage ramp configured to engage the at least one base ramp; and a retaining member configured to cover a least a portion of the first surface and retain the first plurality of ball bearings in the carriage member.

In Example 2, the bearing assembly of Example 1 can optionally be configured such that the retaining member defines an opening that extends about only a portion of the length of the first bearing channel, the opening configured to allow a portion each of the first plurality of ball bearings to extend through the opening.

In Example 3, the bearing assembly of Example 2 can optionally be configured such that the opening includes a first tapered end configured to force a recirculating ball in a direction towards the second surface.

In Example 4, the bearing assembly of any one or any combination of Examples 1-3 can optionally be configured such that the retaining member is a flexible film configured to allow the first plurality of ball bearings to be disposed in the a first bearing channel after the retaining member is attached to the first surface.

In Example 5, the bearing assembly of any one or any combination of Examples 1-4 can optionally be configured such that the base member includes: an adjustment member configured to move the base member relative to the carriage member; and a receiving channel configured to receive the adjustment member.

In Example 6, the bearing assembly of any one or any combination of Examples 1-5 can optionally be configured such that the carriage member includes a second bearing channel configured to receive a second plurality of ball bearings and allow recirculating movement of the second plurality of ball bearings, the second bearing channel having a variable depth, wherein the second bearing channel having a variable depth is configured to allow the second plurality of ball bearings to extend beyond the first surface at a first portion of the second bearing channel and extend below the first surface at a second portion of the second bearing channel.

In Example 7, the bearing assembly of any one or any combination of Examples 1-4 can optionally be configured such that the retaining member is planar.

In Example 8, the bearing assembly of any one or any combination of Examples 1-4 can optionally be configured such that the carriage member is formed of a material consisting of one of a plastic, a polycarbonate, a resin, a polymer.

In Example 9, a bearing assembly can comprise: a carriage member including: a first surface defining a first bearing channel, the first bearing channel configured to receive a first plurality of ball bearings and allow recirculating movement of the plurality of ball bearings, the first bearing channel having a variable depth, wherein the first bearing channel having a variable depth is configured to allow the first plurality of ball bearings to extend beyond the first surface at a first portion of the first bearing channel and extend below the first surface at a second portion of the first bearing channel; a second surface opposing the first surface, the second surface including a first carriage ramp and a second carriage ramp; a base member including a first base ramp and a second base ramp and a receiving channel, the base member configured such that the first base ramp engages the first carriage ramp and the second base ramp engages the second carriage ramp; and an adjustment member engaging the receiving channel and configured to move the base member relative to the carriage member.

In Example 10, the bearing assembly of Example 9 can optionally be configured such that the carriage member includes a second bearing channel configured to receive a second plurality of ball bearings and allow recirculating movement of the second plurality of ball bearings, the second bearing channel having a variable depth, wherein the second bearing channel having a variable depth is configured to allow the second plurality of ball bearings to extend beyond the first surface at a first portion of the second bearing channel and extend below the first surface at a second portion of the second bearing channel.

In Example 11, the bearing assembly of Example 10 can optionally be configured such that the second surface includes a third carriage ramp and a fourth carriage ramp, and wherein the base member includes a third base ramp and a fourth base ramp.

In Example 12, the bearing assembly of any one or any combination of Examples 9-11 can optionally be configured to further comprise a retaining member configured to cover a least a portion of the first surface and retain the first plurality of ball bearings in the carriage member.

In Example 13, the bearing assembly of Example 12 can optionally be configured such that the retaining member defines an opening that extends about only a portion of the length of the first bearing channel, the opening configured to allow a portion each of the first plurality of ball bearings to extend through the opening.

In Example 14, a lift assembly can comprise: a telescoping leg including a movable member and a stationary member; an energy storage member connected to the movable member and the stationary member; a first bearing assembly disposed between the stationary member and the movable member, the bearing assembly comprising: a carriage member including: a first surface defining a first bearing channel, the first bearing channel configured to receive a first plurality of ball bearings and allow recirculating movement of the plurality of ball bearings around the first bearing channel, the first bearing channel having a variable depth, wherein the first bearing channel having a variable depth is configured to allow the first plurality of ball bearings to extend beyond the first surface at a first portion of the first bearing channel and extend below the first surface at a second portion of the first bearing channel; a second surface opposing the first surface, the second surface including a first carriage ramp and a second carriage ramp; a base member including a first base ramp and a second base ramp and a receiving channel; the base member configured such that the first base ramp engages the first carriage ramp and the second base ramp engages the second carriage ramp; and an adjustment member engaging the receiving channel and configured to move the base member relative to the carriage member.

In Example 15, the lift assembly of Example 14 can optionally be configured such that the movable member is triangular in cross section and is coupled to the first bearing assembly, a second bearing assembly and a third bearing assembly.

In Example 16, the lift assembly of any one or any combination of Examples 14-15 can optionally be configured such that the movable member is rectangular in cross section and is coupled to the first bearing assembly, a second bearing assembly, a third bearing assembly, and a fourth bearing assembly.

In Example 17, the lift assembly of any one or any combination of Examples 14-16 can optionally be configured such that the carriage member includes a second bearing channel configured to receive a second plurality of ball bearings and allow recirculating movement of the second plurality of ball bearings, the second bearing channel having a variable depth, wherein the second bearing channel having a variable depth is configured to allow the second plurality of ball bearings to extend beyond the first surface at a first portion of the second bearing channel and extend below the first surface at a second portion of the second bearing channel.

In Example 18, the lift assembly of any one or any combination of Examples 14-17 can optionally be configured such that the second surface includes a third carriage ramp and a fourth carriage ramp; and the base member includes a third base ramp and a fourth base ramp.

In Example 19, the lift assembly of any one or any combination of Examples 14-18 can optionally be configured to further comprise a retaining member configured to cover a least a portion of the first surface and retain the first plurality of ball bearings in the carriage member.

In Example 20, the lift assembly of any one or any combination of Examples 14-19 can optionally be configured such that the retaining member defines an opening that extends about only a portion of the length of the first bearing channel, the opening configured to allow a portion each of the first plurality of ball bearings to extend through the opening.

In Example 21, a method of manufacturing a bearing assembly can comprise the steps of: forming a carriage member, the carriage member including: a first surface having a first plane defining a first bearing channel, the first bearing channel configured to receive a first plurality of ball bearings and allow recirculating movement of the plurality of ball bearings in a second plane, the first bearing channel having a variable depth, wherein the first bearing channel having a variable depth is configured to allow the first plurality of ball bearings to extend beyond the first surface at a first portion of the first bearing channel and extend below the first surface at a second portion of the first bearing channel, wherein the first plane and the second plane are substantially parallel; a second surface opposing the first surface, the second surface including a first carriage ramp and a second carriage ramp; forming a base member, the base member including a first base ramp, a second base ramp, and a receiving channel; the base member configured such that the first base ramp engages the first carriage ramp and the second base ramp engages the second carriage ramp, wherein the receiving channel is configured to receive an adjustment member; and attaching a planar flexible retaining member to the first surface, the planar retaining member defining an opening that extends about only a portion of the length of the first bearing channel, the opening defining a first width orthogonal to the longitudinal axis of the opening; and after the step of attaching the flexible retaining member, inserting a plurality of ball bearings through the opening, each ball bearing having a diameter greater than the first width.

In Example 22, the bearing assembly, lift mechanism, or method of any one or any combination of Examples 1-22 can optionally be configured such that all elements, operations, or other options recited are available to use or select from.

Additional aspects and advantages will be apparent from the following detailed description of example embodiments, which proceeds with reference to the accompanying drawings.

BRIEF DESCRIPTION OF THE DRAWINGS

Corresponding reference characters indicate corresponding parts throughout the several views. The exemplifications set out herein illustrate exemplary embodiments of the invention, and such exemplifications are not to be construed as limiting the scope of the invention in any manner.

FIG. 9A illustrates a top view of a bearing assembly, in accordance with at least one example of this disclosure.

FIG. 9B illustrates a cross section of line 9B-9B of FIG. 9A, in accordance with at least one example of this disclosure.

Figure 1:
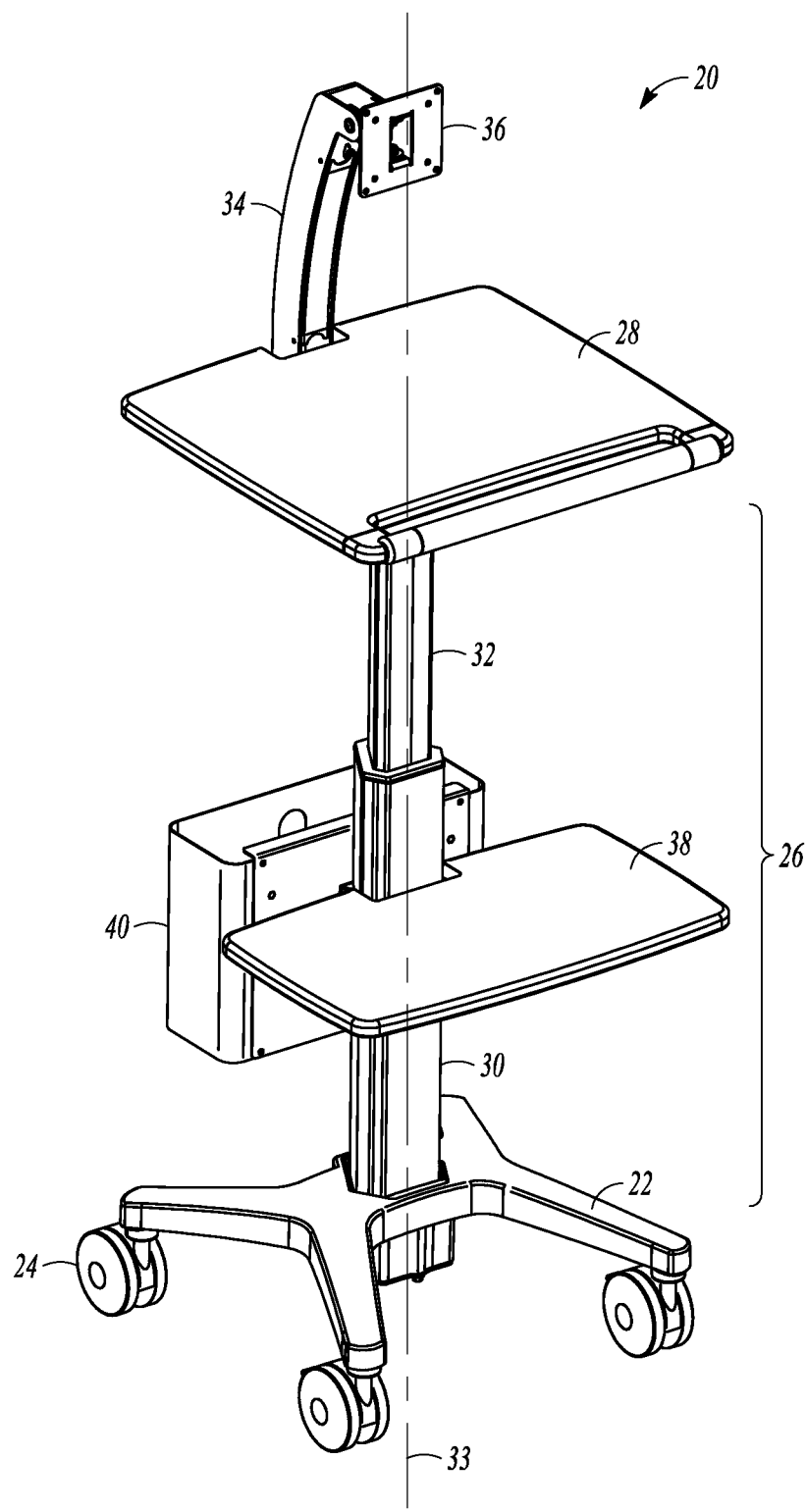
FIG. 1 illustrates a perspective view of a height adjustable device, in accordance with at least one example of this disclosure.

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

FIG. 1 illustrates a perspective view of a height adjustable device 20, in accordance with at least one example of this disclosure. The height adjustable device 20 can include a device base 22, one or more wheels 24, a telescoping leg assembly 26, and a worksurface 28. The telescoping leg assembly 26 can include a stationary member 30 and a movable member 32. The movable member 32 has been illustrated as being surrounded by the stationary member 30. The movable member 32 can translate along a longitudinal axis 33 and provide the height adjustable device 20 with a height adjustment. The worksurface 28 can be mounted near the top of the movable member 32. The stationary member 30 can be coupled to the device base 22. The device base 22 can provide an attachment structure, provide support for the height adjustable device 20, and prevent tipping. Wheels 24 on the device base 22 can allow the height adjustable device 20 to be moved easily.

In another example, the movable member 32 can surround the stationary member 30. In another example, the movable member 32 can be located adjacent the stationary member 30 and can be coupled to the stationary member 30 by a track. The telescoping leg assembly 26 has been illustrated as triangular. The present inventors have contemplated other cross sectional shapes for the telescoping leg assembly 26 such as rectangular, oval, round, or having a cross section that is a combination of curved and straight segments without changing the scope of the present application.

The height adjustable device 20 can include a display support 34 and a display mount 36 for mounting a display such as a computer monitor. The height adjustable device 20 can include an auxiliary worksurface 38 and a container box 40. The container box 40 can be configured to hold a CPU or power pack such as a battery.

Figure 2A:
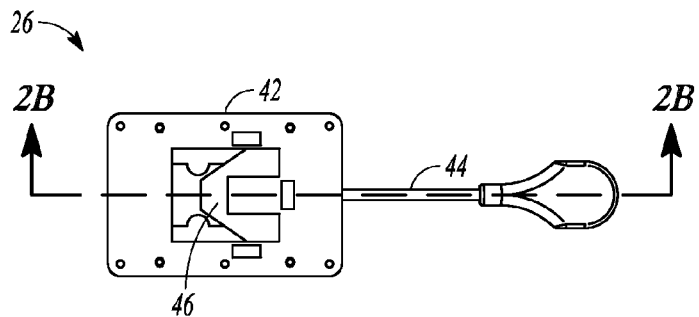
FIG. 2A illustrates a top view of a telescoping leg assembly, in accordance with at least one example of this disclosure.

FIG. 2A illustrates a top view of a telescoping leg assembly 26, in accordance with at least one example of this disclosure. A mounting bracket 42 can be coupled to the top of the telescoping leg assembly 26. The mounting bracket 42 can provide a mounting surface for the worksurface 28 (see FIG. 1). An actuation lever 44 can extend from an actuation member 46. The actuation member 46 can be a valve for a locking gas spring, a braking mechanism, or an actuation control that can control or lock movement of the telescoping leg assembly 26. In an example, the mounting bracket 42 can be configured to hold any device that can benefit from a height adjustment such as a chair, a toolbox, or a display screen.

Figure 2B:
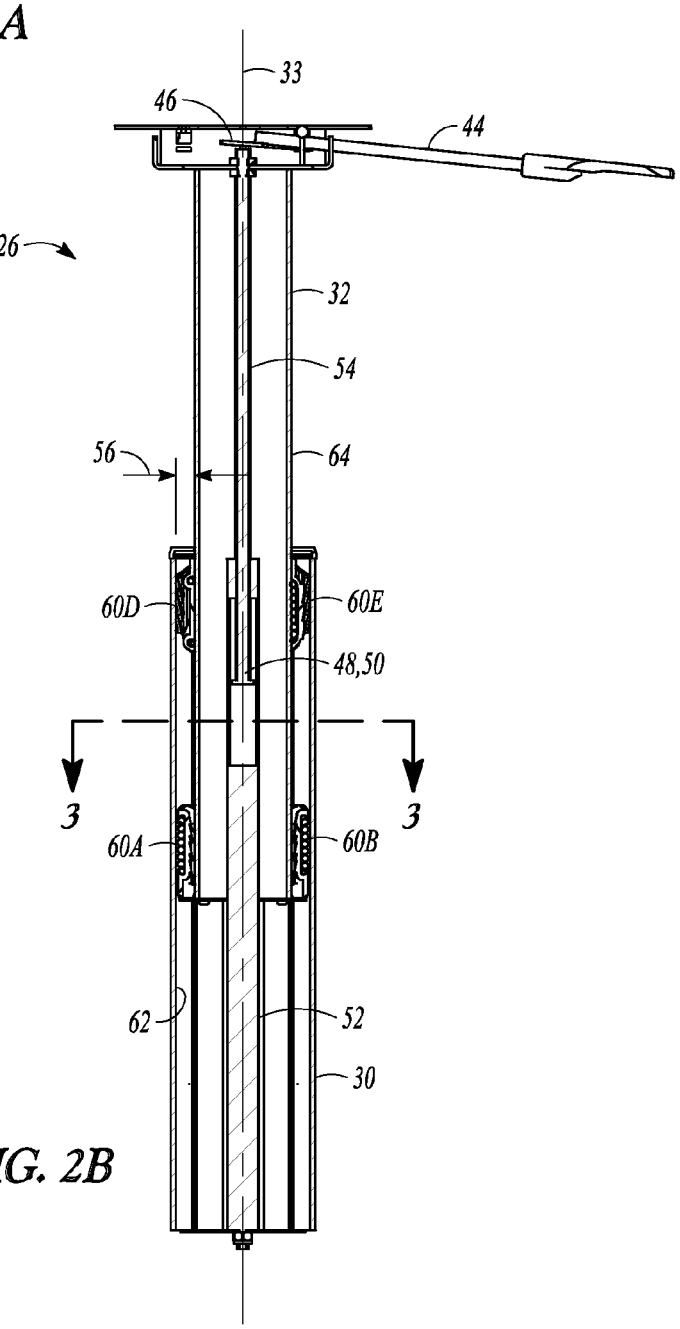
FIG. 2B illustrates a cross section of line 2B-2B of FIG. 2A, in accordance with at least one example of this disclosure.

FIG. 2B illustrates a cross section of line 2B-2B of FIG. 2A, in accordance with at least one example of this disclosure. The telescoping leg assembly 26 can include an energy storage member 48 that can provide a force that can aid the movable member 32 to translate along a longitudinal axis 33. The energy storage member 48 can be a gas spring, a spring, a hydraulic ram, or a linear actuator powered by an electric motor. A gas spring 50 is illustrated and can include a cylinder 52 coupled to the stationary member 30 and a piston 54 coupled to the movable member 32. The gas spring 50 can include the actuation member 46 that can be actuated by the actuation lever 44.

A gap 56 can separate the movable member 32 and the stationary member 30. One or more bearing assemblies, such as bearing assemblies 60A, 60B, 60C, 60D, 60E, 60F (for 60C see FIG. 3, 60F not shown) can be located in the gap 56 to provide a reduced friction engagement between the movable member 32 and the stationary member 30. In an example, bearing assemblies 60A, 60B can be coupled to a lower portion of the movable member 32 and can move with the movable member 32 as it translates along the longitudinal axis 33. The bearing assemblies 60A, 60B can slide along an inner surface 62 of the stationary member 30.

In an example, bearing assemblies 60D, 60E can be coupled to an upper portion of the stationary member 30. An outer surface 64 of the movable member 32 can slide along bearing assemblies 60D, 60E as the movable member 32 translates along the longitudinal axis 33. In an example, the configuration of the telescoping leg assembly 26 can be reversed and the movable member 32 can be located outside of the stationary member 30 and the bearing assembly locations will be changed accordingly. In an example, the movable member 32 can be adjacent the stationary member 30 and the bearing assembly locations will be changed accordingly.

Figure 3:
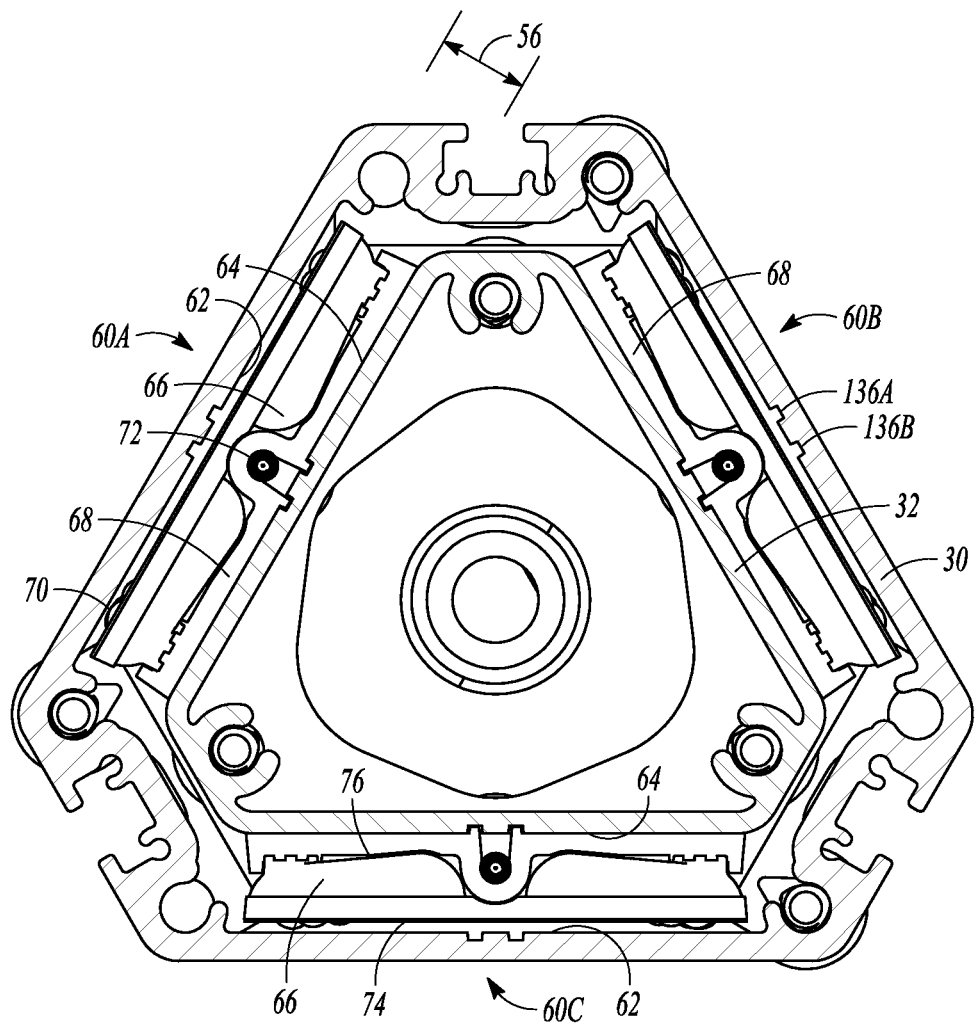
FIG. 3 illustrates a cross section of line 3-3 of FIG. 2B, in accordance with at least one example of this disclosure.

FIG. 3 illustrates a cross section of line 3-3 of FIG. 2B, in accordance with at least one example of this disclosure. The cross section of the telescoping leg assembly 26 can be triangular. In each face of the telescoping leg assembly 26, the movable member 32 can include an outer surface 64 and the stationary member can include an inner surface 62. Gap 56 can be a width between the outer surface 64 and the inner surface 62. The bearing assembly 60A can be located in gap 56, and bearing assemblies 60B and 60C can be located in corresponding gaps.

Figure 5A:
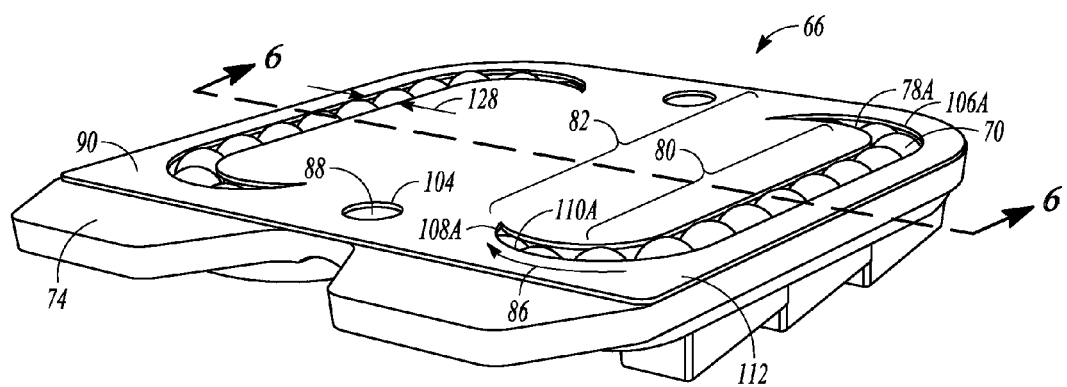
FIG. 5A illustrates a top perspective view of a carriage member, in accordance with at least one example of this disclosure.
Figure 5B:
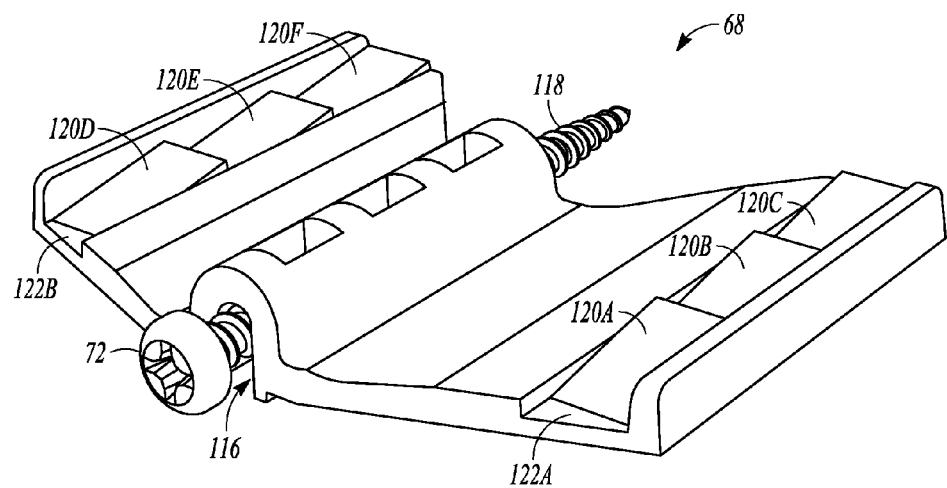
FIG. 5B illustrates a top perspective view of a base member, in accordance with at least one example of this disclosure.

Each bearing assembly 60A, 60B, 60C can include a carriage member 66, a base member 68, a plurality of ball bearings 70, and an adjustment member 72 (this view does not show the head of adjustment member—see also FIG. 5B). The bearing assemblies 60A, 60B, 60C can be adjusted in the width of the gap 56 to provide a preload between the movable member 32 and the stationary member 30 and/or to compensate for any differences in widths between the three gaps. The bearing assemblies 60A, 60B, 60C can be adjusted to prevent any unwanted slop or free-play between the inner surface 62, the bearing assembly 60A, and the outer surface 64. The bearing assemblies 60A-F (see also FIG. 2B) can allow a reduced friction sliding movement between the movable member 32 and the stationary member 30.

The carriage member 66 can include a first surface 74 that can face the inner surface 62, and a second surface 76 that can face the outer surface 64. The carriage member 66 can be located so that the first surface 74 is generally parallel with the outer surface 64 and/or the inner surface 62. The ball bearings 70 can recirculate in a plane that is generally parallel with the plane of the surface that they contact, such as the inner surface 62. The ball bearings 70 can be formed of plastic, polycarbonate, polymers, resins, metals, or composites of the aforementioned materials.

Bearing assemblies 60D, 60E, 60F (60F not shown) can be coupled to the stationary member 30 and the ball bearings 70 can roll against the outer surfaces 64 (see FIG. 2B).

Figure 4A:
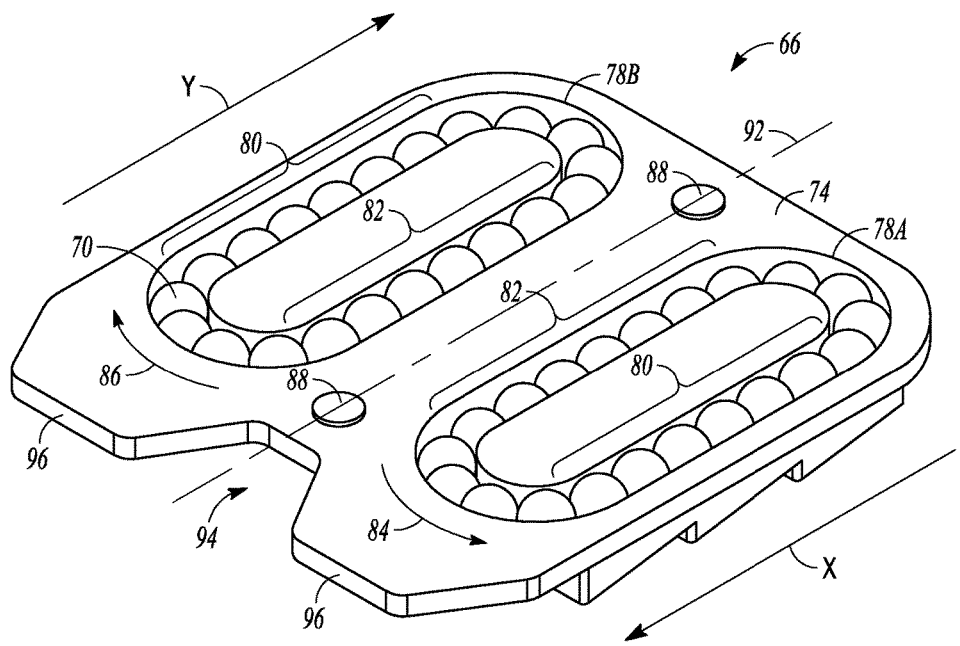
FIG. 4A illustrates a top perspective view of a carriage member, in accordance with at least one example of this disclosure.

FIG. 4A illustrates a top perspective view of a carriage member 66, in accordance with at least one example of this disclosure. The carriage member 66 can be formed of plastic, polycarbonate, polymers, resins, metals, or composites of the aforementioned materials. The carriage member 66 can include a first bearing channel 78A and a second bearing channel 78B that can be defined in the first surface 74. The first and second bearing channels 78A, 78B can include a depression or track that can allow the ball bearings 70 to move in a recirculating motion, e.g., one or more times around the channel, as a surface engaging the ball bearings moves relative to the bearing assembly 60A (see FIGS. 2B, 3).

The first bearing channel 78A can include two portions, a first portion 80 and a second portion 82. The first bearing channel 78A can include a variable depth (see FIG. 6), such that the first portion 80 can have a lesser depth from the first surface 74 than the second portion 82. The first bearing channel 78A can be configured so that when the ball bearings 70 are located in the first portion 80 of the first bearing channel 78A, the variable depth of the first bearing channel 78A can allow the ball bearings 70 to extend beyond the first surface 74. As the ball bearings 70 extend beyond the first surface 74, they can engage a surface such as the inner surface 62 shown in FIG. 3.

The first bearing channel 78A can include a second portion 82 having a greater depth than the first portion 80. The second portion 82 can be configured such that the ball bearings 70 do not extend out from the first surface 74 as far as the ball bearings 70 in the first portion 80. Such a configuration can allow the ball bearings 70 to recirculate in the first bearing channel 78A as the bearing assembly 60A (see FIG. 3) is moved relative to a surface that contacts the ball bearings 70. In an example, the ball bearings 70 in the second portion 82 may not extend beyond the first surface 74. FIG. 3 illustrates a bearing assembly 60A including a carriage member 66 as described above. As shown in the example, the ball bearings 70 are in contact with the inner surface 62 in the first portion 80 of the first bearing channel 78A and the ball bearings 70 in the second portion 82 are not contacting the inner surface 62.

Returning to FIG. 4A, when the ball bearings 70 are moved along a surface or in the alternative, when a surface is moved along the ball bearings 70, the ball bearings 70 can recirculate within the first bearing channel 78A. In an example, if the carriage member 66 is moved in direction X past a stationary surface, the ball bearings 70 will recirculate in a counterclockwise direction 84 in the first bearing channel 78A. The carriage member 66 can be configured with more than one bearing channel, such as with a second bearing channel 78B. The second bearing channel 78B can be configured with a first portion 80 and a second portion 82.

In an example, if the carriage member 66 is moved in direction X beyond a stationary surface, the ball bearings 70 will recirculate in a clockwise direction 86 in the second bearing channel 78B. If the movement of the carriage member 66 is reversed, such as in direction Y, the movement of the ball bearings 70 in the first and second bearing channels 78A, 78B can also reverse. The first surface 74 can include retainer bosses 88 that can extend outwardly from the first surface 74. The retainer bosses 88 can act to locate and stabilize a retaining member 90 (see FIG. 5A). In an example, the carriage member 66 can be symmetrical about a midline 92. The carriage member can define a recess 94 that can provide clearance for a portion of the base member 68 or the adjustment member 72. On either side of the recess 94 the carriage member 66 can define tabs 96 that will be described more fully below.

Figure 4B:
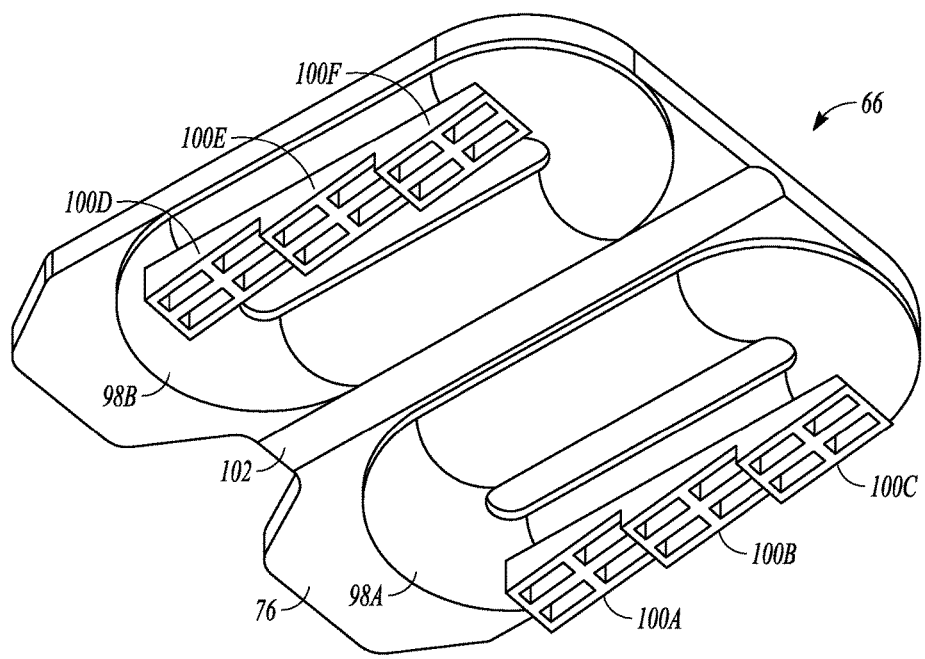
FIG. 4B illustrates a bottom perspective view of a carriage member, in accordance with at least one example of this disclosure.

FIG. 4B illustrates a bottom perspective view of a carriage member 66 in accordance with at least one example of this disclosure. The carriage member 66 can be included in a bearing assembly 60A as described above. The carriage member 66 can be configured as illustrated with the generally rounded first bearing channel exterior 98A extending from planar portions of the second surface 76 that are generally parallel and opposite the first surface 74. On the second surface 76 side of the first portion 80 (see FIG. 4A) of the first bearing channel exterior 98A a first carriage ramp 100A can be located.

In an example, additional carriage ramps 100B, 100C can be included. In an example, the carriage member 66 can include a second bearing channel exterior 98B. The second bearing channel exterior 98B can include a fourth carriage ramp 100D located on the second surface 76 side of the first portion 80 of the second bearing channel exterior 98B (see FIG. 4A). In an example, additional carriage ramps 100E, 100F can be included. The second surface 76 can include a groove 102 that can be defined as a semi-cylindrical cavity and extend from the recess 94 to an opposing end of the carriage member 66. In an example, the groove 102 can extend the length of the middle of the carriage member 66 and can provide clearance and/or a sliding surface for portions of the base member 68 (see FIG. 5B).

FIG. 5A illustrates a top perspective view of a carriage member 66, in accordance with at least one example of this disclosure. The first surface 74 can be wholly or partially covered by a retaining member 90. The retaining member 90 can be configured as a thin planar flexible film. The retaining member 90 can define boss holes 104 that can fit over retaining bosses 88. The engagement between the retainer bosses 88 and the boss holes 104 can be a snap-fit and can aid in holding the retaining member 90 to the first surface 74.

In an example, the retaining member 90 can be coupled to the first surface 74 with an adhesive. The retaining member 90 can define a first opening 106A that can be generally located over the first portion 80 (see also FIG. 4A). The first opening 106A can define an opening width 128 that is generally orthogonal to the main long axis of the opening 106A. The width 128 at its largest width can be smaller than a ball diameter 114 (see FIG. 6). The first opening 106A can be curved in a manner similar to the first bearing channel 78A and can include a C-shaped opening. A first end 108A of the first opening 106A can define a first taper 110A, wherein the first opening 106A becomes narrower towards the tip. If the ball bearings 70 are recirculating in a clockwise direction 86, as the ball bearings 70 engage the first taper 110A, the ball bearings 70 can be forced in a direction away from the first surface 74 as the width of the first taper 110A becomes smaller and smaller, since less of the ball bearing 70 is able to extend from the retaining member 90.

The ball bearings 70 can be located fully underneath the retaining member 90 in all or portions of the second portion 82. In an example, the retaining member 90 can be configured as a flexible film 112. The flexible film 112 can flex such that even though the ball bearing diameter 114 (see FIG. 6) can be larger than the width 128 of the first opening 106A, during an assembly of the bearing assembly, the ball bearings 70 can be pushed through the first opening 106A and into the first bearing channel 78A. The flexible film 112 can bend so that the width 128 enlarges enough to allow the ball bearing 70 to pass through the first opening 106A. Once the ball bearing is located in the first bearing channel 78A, the flexible film 112 can return to its original planar condition and can keep the ball bearings 70 from falling out of the first bearing channel 78A.

FIG. 5B illustrates a top perspective view of a base member 68, in accordance with at least one example of this disclosure. The base member 68 can be formed of plastic, polycarbonate, polymers, resins, metals, or composites of the aforementioned materials. The base member 68 can be configured as a generally planar body and can include features that complement features of the second surface 76 (see FIG. 4B). A receiving channel 116 can be defined as an opening in the base member 68 and can include female threads (not shown) that can match threads 118 on the adjustment member 72. The receiving channel 116 can be configured as generally cylindrical and can match a profile of a generally cylindrical groove 102 (see FIG. 4B).

In an example, the receiving channel 116 and the groove 102 can be configured as having matching rectangular cross sections. The base member can include base ramps 120A-F that can have inclined surfaces and can engage the carriage ramps 100A-F (see FIG. 4B). Turning the adjustment member 72 can move the base member 68 relative to the carriage member 66 and can cause base ramps 120A-F change position along carriage ramps 100A-F. Although the bearing assemblies have been illustrated as having six sets of mating ramps, any number of mating ramps can be used. In an example, the base member 68 can include ramp cutouts 1224A, 122B that can provide a track for the carriage ramps, such as carriage ramps 100A and 100D (see FIG. 4B.). The adjustment member 72 can be a screw or bolt.

In an example a bearing assembly can include a carriage member configured with only one bearing channel and a base member can be configured to match with such a carriage member.

Figure 6:
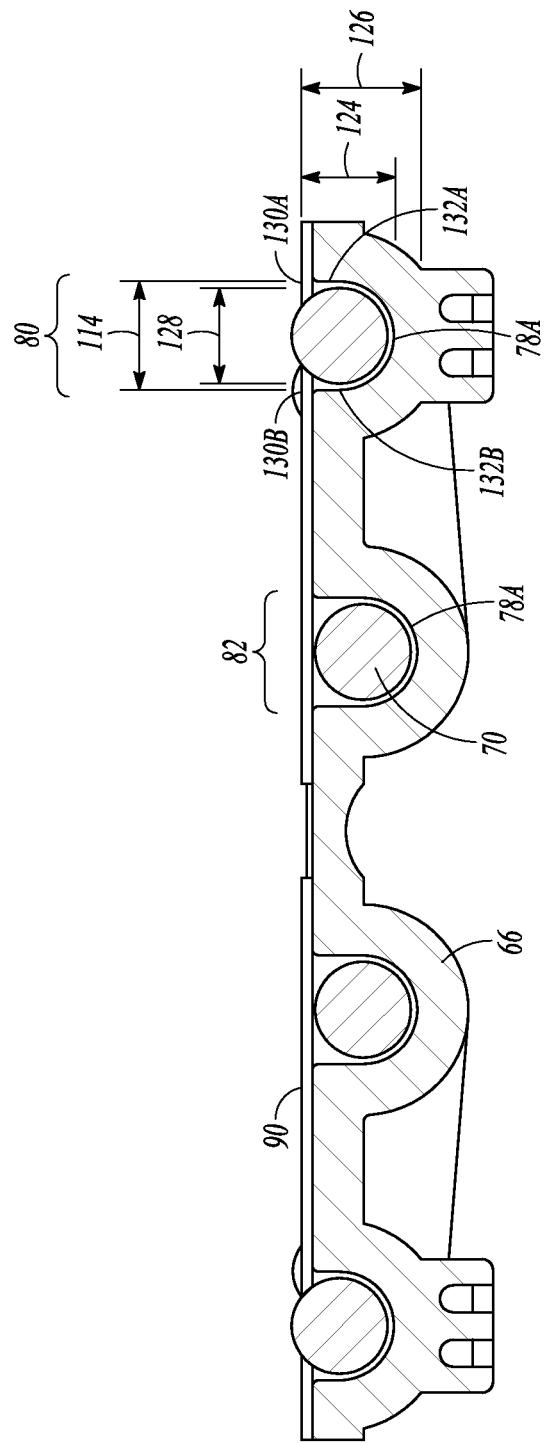
FIG. 6 illustrates a cross section of line 6-6 of FIG. 5A, in accordance with at least one example of this disclosure.

FIG. 6 illustrates a cross section of line 6-6 of FIG. 5A, in accordance with at least one example of this disclosure. The variable depth of the first bearing channel 78A can include a first depth 124 in the first portion 80 and a second depth 126 in the second portion 82. The width of the first bearing channel 78A can be slightly larger than a ball diameter 114. The opening width 128 can be less than the ball diameter 114. The retaining member 90 can be installed on the carriage member 66 before the ball bearings 70 are inserted into the first bearing channel 78A. The retaining member 90 can include a first edge 130A and a second edge 130B that extend beyond the first and second walls 132A, 132B of the first bearing channel 78A.

A ball bearing 70 can be inserted into the first bearing channel 78A and the first and second edges 130A, 130B can flex and create an opening that is larger than the ball diameter 114. The ball bearing 70 can then pass through the retaining member 90 into the first bearing channel 78A. Once the ball diameter 114 has passed through the retaining member 90, the first and second edges 130A, 130B can return to their normal un-flexed planar position and the opening width 128 can be smaller than the ball diameter 114. The retaining member 90 can keep the ball bearings 70 from falling out of the bearing assembly 60A during handling or assembly into a telescoping leg 26 (see FIG. 2B). The retaining member 90 can allow easy handling of the bearing assembly 60A during installation into a lift mechanism 20 (see FIG. 1) or other device without danger of release of the ball bearings 70 from the first bearing channel 78A.

The ball bearings 70 in the first portion 80 can extend beyond the retaining member 90 while ball bearings 70 in the second portion 82 can be fully covered by the retaining member 90. The carriage member 66 can be configured such that the first portion 80 of the first and second bearing channels 78A-B is located toward the outer edges of the carriage member 66. The carriage member 66 can be configured such that the second portion 82 of the first and second bearing channels 78A-B is located nearer the midline 92 of the carriage member 66 (see FIG. 4A also).

Figure 7A:
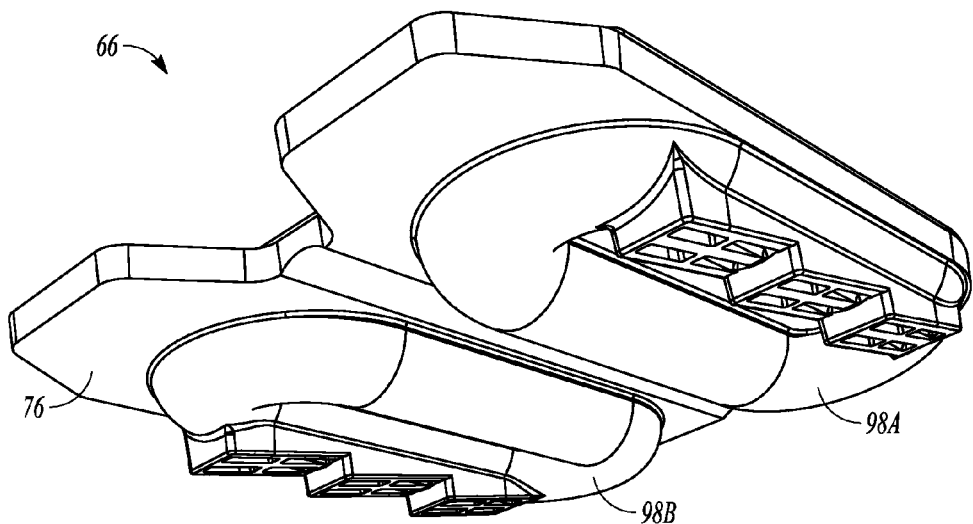
FIG. 7A illustrates a bottom perspective view of a carriage member, in accordance with at least one example of this disclosure.
Figure 7B:
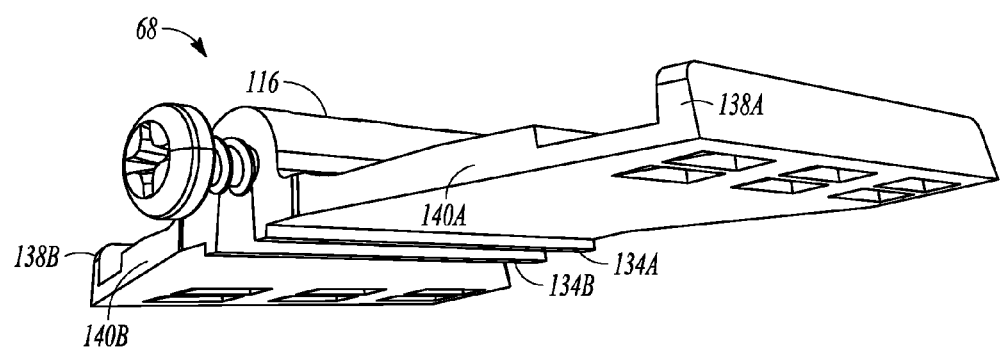
FIG. 7B illustrates a bottom perspective view of a base member, in accordance with at least one example of this disclosure.

FIG. 7A illustrates a bottom perspective view of a carriage member 66, in accordance with at least one example of this disclosure. FIG. 7B illustrates a bottom perspective view of a base member 68, in accordance with at least one example of this disclosure. As shown, the base member 68 can include a profile that allows clearance for features of the second surface 76, such as the first and second bearing channel exteriors 98A, 98B. Locating rails 134A, 134B can locate and secure the base member 68 with mating features 136A, 136B of the inner surface 62 shown in FIG. 3. The base member profile can include a rounded exterior of the receiving channel 116, generally planar wings 140A, 140B that extend outwardly from the receiving channel 116 and edge rails 138A, 138B that can engages sides of the first and second bearing channel exteriors 98A, 98B.

Figure 8:
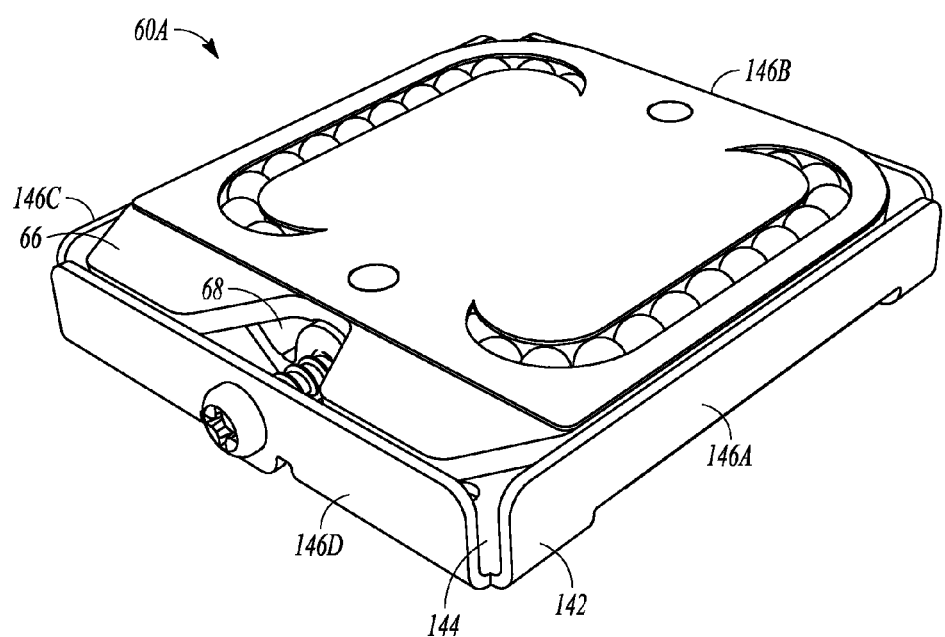
FIG. 8 illustrates a perspective view of a bearing assembly, in accordance with at least one example of this disclosure.

FIG. 8 illustrates a perspective view of a bearing assembly 60A, in accordance with at least one example of this disclosure. The bearing assembly 60A can be located in a bearing cage 142. The bearing cage 142 is illustrated as rectangularly shaped and box-like, having a bottom 144 and walls 146A, 146B, 146C, and 146D. The bearing cage 142 can keep the bearing assembly 60A secured in place as the movable member 32 translates relative to the stationary member 30 (see FIG. 2B). The base member 68 can be located between the bottom 144 and the carriage member 66.

FIG. 9A illustrates a top view of a bearing assembly 60A, in accordance with at least one example of this disclosure. FIG. 9B illustrates a cross section of line 9B-9B of FIG. 9A, in accordance with at least one example of this disclosure. The base member 68 can include one or more base ramps 120A-C that can engage one or more carriage ramps 100A-C. The first carriage ramp 100A can be complementary to the first base ramp 120A and can include a similar incline angle 148 such that the angled surfaces of the first carriage ramp 100A and the first base ramp 120A can be engaged along their mating surfaces. Although the base member 68 and the carriage member 66 are illustrated with three complementary ramps, the present inventor has contemplated a bearing assembly 60A having one carriage ramp and one base ramp without changing the intent of the present application. The present inventor has contemplated including any number of complementary ramps such as from about 2-15 complementary ramps without changing the intent of the present application.

The adjustment member 72 can cause the base member 68 to move relative to the carriage member 66. Because of the inclined surfaces of the engaged first carriage ramp 100A and first base ramp 120A (and any other complementary ramps in the bearing assembly 60A), as the base member 68 is moved in a first direction 150, the carriage member/base member width 152 of the bearing assembly 60A will increase. As the base member is moved in a second direction 154, the carriage member/base member width 152 will decrease.

Wall 146D can function as a first stop plate 158A. Portions of the carriage member 66, such as tabs 96 can engage the first stop plate 158A. When the adjustment member 72 is turned such that the base member 68 moves in a first direction 150 towards wall 146D, the engagement between the first stop plate 158A and the tabs 96 can prevent the carriage member 66 from moving relative to the bearing cage 142. The base member 68 however can be free to move and the incline of the carriage ramps and the base ramps (see FIG. 9B) can cause the carriage member/base member width 152 to increase. If the adjustment member 72 is turned in the opposite direction, the wall 146B can function as a second stop plate 158B and can engage the rear edge 156 of the carriage member 66 and prevent the carriage member 66 from moving relative to the bearing cage 142. If base member 68 moves in a second direction 154 toward wall 146B, the incline of the carriage ramps and the base ramps can cause the width of the carriage member/base member assembly to decrease.

In a telescoping leg assembly 26 (see FIG. 2B) having more than one bearing assembly, the bearing assemblies can be adjusted to provide an even preload from all sides and can also compensate for differences in dimensions of gap 56 in each bearing assembly.

The stop plate 158A can be integral with the bearing cage 142 as shown or can be configured as separate piece that can be secured to either the movable member 32 or the stationary member 30. In an example, the outer surface 64 can be configured to form a structure that functions as the bottom 144 of a bearing cage 142 (see FIG. 3). In an example, a structure performing the functions of the bearing cage 142 can be defined as a cavity or space in the movable member 32 or the stationary member 30. The bearing cage 142 or such a cavity or space can be irregularly shaped.

Figure 10B:
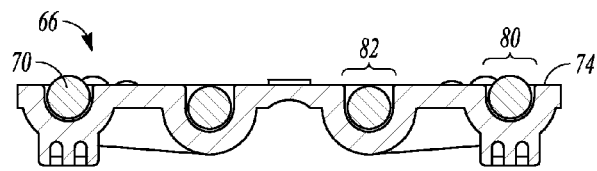
FIG. 10B illustrates a cross-section of line 10B-10B of FIG. 10A, in accordance with at least one example of this disclosure.
Figure 10A:
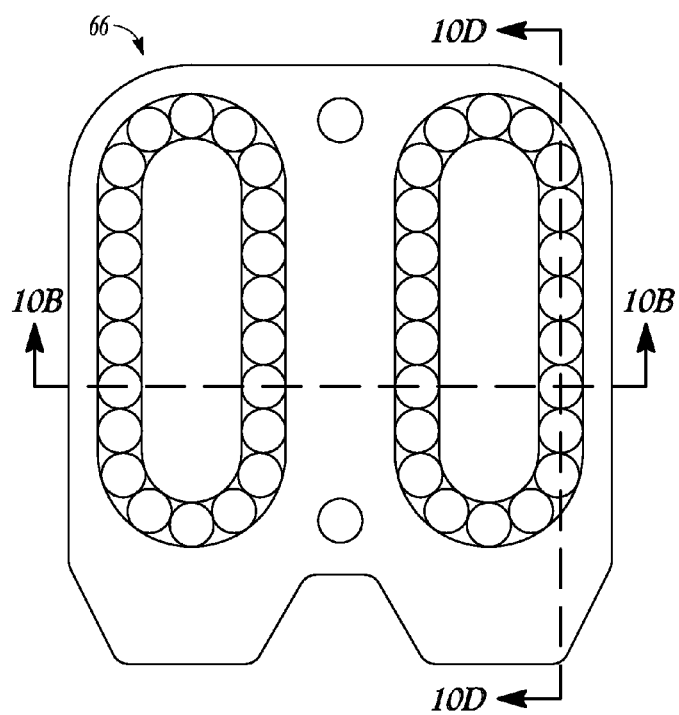
FIG. 10A illustrates a top view of a carriage member, in accordance with at least one example of this disclosure.

FIG. 10A illustrates a top view of a carriage member 66, in accordance with at least one example of this disclosure. FIG. 10B illustrates a cross-section of line 10B-10B of FIG. 10A, in accordance with at least one example of this disclosure. The variable depth of the first bearing channel 78A allows the ball bearings 70 to extend beyond the first surface 74 in the first portion 80 and be located below the first surface 74 in the second portion 82. Such a configuration allows the ball bearings 70 in the first portion 80 to contact a sliding surface such as the inner surface 62 of the stationary member 30 shown in FIG. 3.

Figures 10D, 10E:
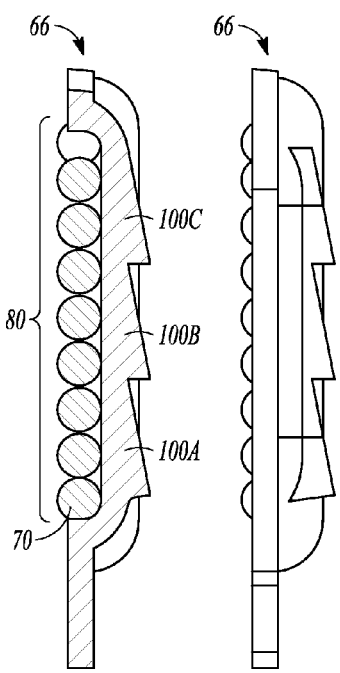
FIG.10D illustrates a cross-section of line 10D-10D of FIG. 10A, in accordance with at least one example of this disclosure.
FIG. 10E illustrates a side view of a carriage member, in accordance with at least one example of this disclosure.
Figure 10C:
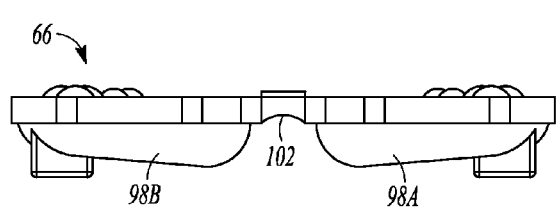
FIG. 10C illustrates a front view of a carriage member, in accordance with at least one example of this disclosure.

FIG. 10C illustrates a front view of a carriage member 66, in accordance with at least one example of this disclosure. As illustrated, the groove 102 and the cavity defined between the first bearing channel exterior 98A and the second bearing channel exterior 98B can define a space for location of the receiving channel 116 when the base member 68 is placed against the carriage member 66 (see FIGS. 7A-B).

FIG. 10D illustrates a cross-section of line 10D-10D of FIG. 10A, in accordance with at least one example of this disclosure. Carriage ramps 100A, 100B, 100C can be located directly under the first portion 80, such that adjustment of the carriage ramps and the base ramps can directly affect the preload of the ball bearings 70 against the sliding surface they engage. FIG. 10E illustrates a side view of a carriage member, in accordance with at least one example of this disclosure.

Figures 11A, 11B:
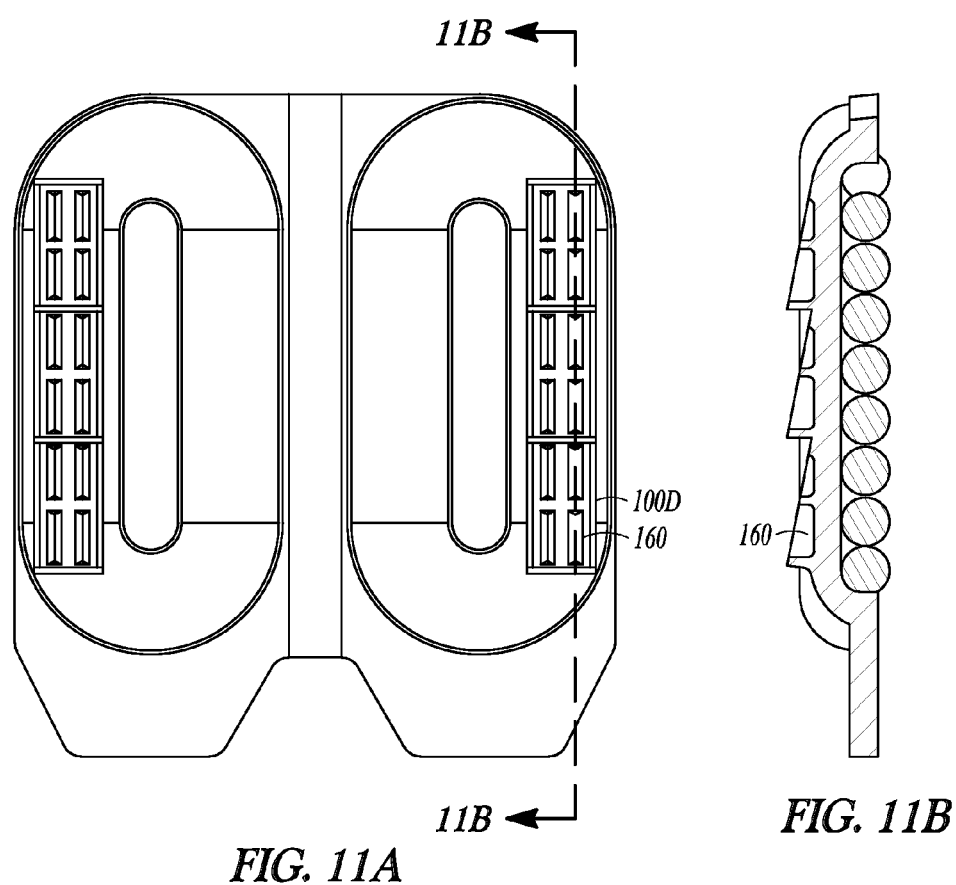
FIG. 11A illustrates a bottom view of a carriage member, in accordance with at least one example of this disclosure.
FIG. 11B illustrates a cross-section of line 11B-11B of FIG. 11A, in accordance with at least one example of this disclosure.

FIG. 11A illustrates a bottom view of a carriage member 66, in accordance with at least one example of this disclosure. FIG. 11B illustrates a cross-section of line 11B-11B of FIG. 11A, in accordance with at least one example of this disclosure. The cavity 160 in the carriage ramp 100D can allow the carriage member 66 to be lighter and can also aid in injection molding procedures.

Figure 12:
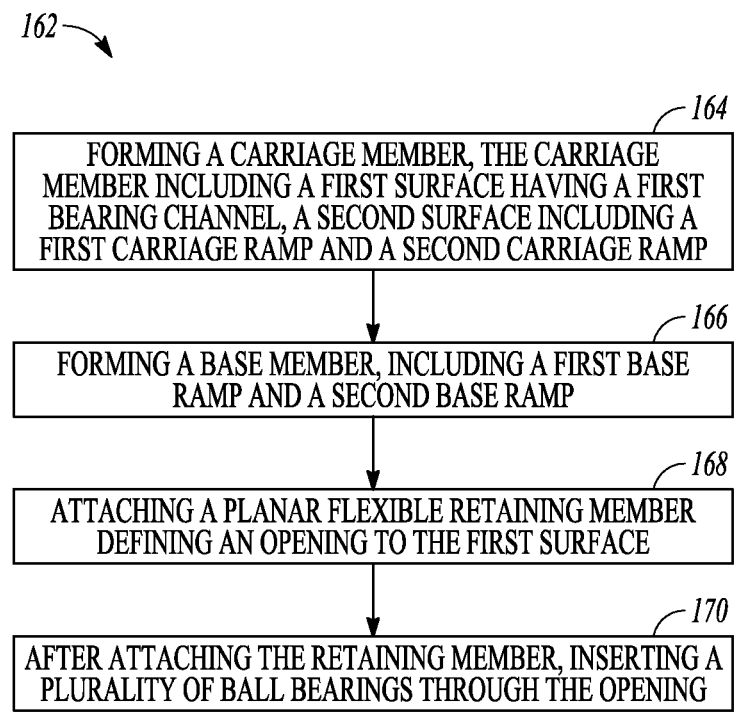
FIG. 12 illustrates a flowchart of a method of manufacture of a bearing assembly, in accordance with at least one example of this disclosure.

FIG. 12 illustrates a flow chart of an example method 162 of manufacturing a bearing assembly, in accordance with at least one example of this disclosure. The method 162 can include the steps of forming a carriage member, the carriage member including: a first surface having a first bearing channel, a second surface including a first carriage ramp and a second carriage ramp 164; forming a base member, including a first base ramp, a second base ramp 166; attaching a planar flexible retaining member defining an opening to the first surface 168; and after attaching the retaining member, inserting a plurality of ball bearings through the opening 170.

The bearing assembly, carriage member, base member, retaining member, and associated elements described in the method 162 can include all the attributes as described above and in FIGS. 2-11. Portions of the bearing assembly can be formed of the materials outlined above and through processes such as injection molding, additive manufacturing, conventional machining, or casting. The retaining member can be planar, and have an opening that is smaller than the width of the ball bearings or the bearing channel in which the ball bearing recirculate. As such one or more edges of the retaining member can extend over the opening. When a ball bearing is inserted past the opening, these edges can flex, The edges will no longer be in the plane of the rest of the retaining member and the flex of the edges will allow the opening to be wider than the ball bearing diameter. The ball bearings can then pass through the opening. The flexed edges can return to their normal planar condition and will retain the ball bearing in the bearing channel.

Although the bearing assemblies herein have been described as associated with a lift assembly it is fully contemplated by the inventor that these bearing assemblies can be used wherever one surface slides against another such as in drawer slides, any form of telescoping mechanism, movable furniture, tooling sliding mechanisms, and the like.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Geometric terms, such as "parallel", "perpendicular", "round", or "square", are not intended to require absolute mathematical precision, unless the context indicates otherwise. Instead, such geometric terms allow for variations due to manufacturing or equivalent functions. For example, if an element is described as "round" or "generally round," a component that is not precisely circular (e.g., one that is slightly oblong or is a many-sided polygon) is still encompassed by this description.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. A bearing assembly comprising:
   a base member including at least one base ramp;
   a carriage member including:
      a first surface defining a first bearing channel, the first bearing channel configured to receive a first plurality of ball bearings and allow recirculating movement of the plurality of ball bearings around the first bearing channel, the first bearing channel having a variable depth, wherein the first bearing channel having a variable depth is configured to allow the first plurality of ball bearings to extend beyond the first surface at a first portion of the first bearing channel and extend below the first surface at a second portion of the first bearing channel;
      a second surface opposing the first surface, the second surface including at least one carriage ramp, the carriage ramp configured to engage the at least one base ramp; and
      a retaining member configured to cover a least a portion of the first surface and retain the first plurality of ball bearings in the carriage member.

2. The bearing assembly of claim 1, wherein the retaining member defines an opening that extends about only a portion of the length of the first bearing channel, the opening configured to allow a portion each of the first plurality of ball bearings to extend through the opening.

3. The bearing assembly of claim 2, wherein the opening includes a first tapered end configured to force a recirculating ball in a direction towards the second surface.

4. The bearing assembly of claim 1, wherein the retaining member is a flexible film configured to allow the first plurality of ball bearings to be disposed in the a first bearing channel after the retaining member is attached to the first surface.

5. The bearing assembly of claim 1, wherein the base member includes:
   an adjustment member configured to move the base member relative to the carriage member; and
   a receiving channel configured to receive the adjustment member.

6. The bearing assembly of claim 1, wherein the carriage member includes a second bearing channel configured to receive a second plurality of ball bearings and allow recirculating movement of the second plurality of ball bearings, the second bearing channel having a variable depth, wherein the second bearing channel having a variable depth is configured to allow the second plurality of ball bearings to extend beyond the first surface at a first portion of the second bearing channel and extend below the first surface at a second portion of the second bearing channel.

7. The bearing assembly of claim 1, wherein the retaining member is planar.

8. The bearing assembly of claim 1, wherein the carriage member is formed of a material consisting of one of a plastic, a polycarbonate, a resin, a polymer.

9. A bearing assembly comprising:
   a carriage member including:
      a first surface defining a first bearing channel, the first bearing channel configured to receive a first plurality of ball bearings and allow recirculating movement of the plurality of ball bearings, the first bearing channel having a variable depth, wherein the first bearing channel having a variable depth is configured to allow the first plurality of ball bearings to extend beyond the first surface at a first portion of the first bearing channel and extend below the first surface at a second portion of the first bearing channel;
      a second surface opposing the first surface, the second surface including a first carriage ramp and a second carriage ramp;
   a base member including a first base ramp and a second base ramp and a receiving channel, the base member configured such that the first base ramp engages the first carriage ramp and the second base ramp engages the second carriage ramp; and
   an adjustment member engaging the receiving channel and configured to move the base member relative to the carriage member.

10. The bearing assembly of claim 9, wherein the carriage member includes a second bearing channel configured to receive a second plurality of ball bearings and allow recirculating movement of the second plurality of ball bearings, the second bearing channel having a variable depth, wherein the second bearing channel having a variable depth is configured to allow the second plurality of ball bearings to extend beyond the first surface at a first portion of the second bearing channel and extend below the first surface at a second portion of the second bearing channel.

11. The bearing assembly of claim 10, wherein the second surface includes a third carriage ramp and a fourth carriage ramp, and wherein the base member includes a third base ramp and a fourth base ramp.

12. The bearing assembly of claim 9, comprising a retaining member configured to cover a least a portion of the first surface and retain the first plurality of ball bearings in the carriage member.

13. The bearing assembly of claim 12, wherein the retaining member defines an opening that extends about only a portion of the length of the first bearing channel, the opening configured to allow a portion each of the first plurality of ball bearings to extend through the opening.

14. A lift assembly comprising:
   a telescoping leg including a movable member and a stationary member;
   an energy storage member connected to the movable member and the stationary member;
   a first bearing assembly disposed between the stationary member and the movable member, the bearing assembly comprising:
      a carriage member including:
         a first surface defining a first bearing channel, the first bearing channel configured to receive a first plurality of ball bearings and allow recirculating movement of the plurality of ball bearings around the first bearing channel, the first bearing channel having a variable depth, wherein the first bearing channel having a variable depth is configured to allow the first plurality of ball bearings to extend beyond the first surface at a first portion of the first bearing channel and extend below the first surface at a second portion of the first bearing channel;
         a second surface opposing the first surface, the second surface including a first carriage ramp and a second carriage ramp;
      a base member including a first base ramp and a second base ramp and a receiving channel; the base member configured such that the first base ramp engages the first carriage ramp and the second base ramp engages the second carriage ramp; and
      an adjustment member engaging the receiving channel and configured to move the base member relative to the carriage member.

15. The lift assembly of claim 14, wherein the movable member is triangular in cross section and is coupled to the first bearing assembly, a second bearing assembly and a third bearing assembly.

16. The lift assembly of claim 14, wherein the movable member is rectangular in cross section and is coupled to the first bearing assembly, a second bearing assembly, a third bearing assembly, and a fourth bearing assembly.

17. The lift assembly of claim 14, wherein the carriage member includes a second bearing channel configured to receive a second plurality of ball bearings and allow recirculating movement of the second plurality of ball bearings, the second bearing channel having a variable depth, wherein the second bearing channel having a variable depth is configured to allow the second plurality of ball bearings to extend beyond the first surface at a first portion of the second bearing channel and extend below the first surface at a second portion of the second bearing channel.

18. The lift assembly of claim 14, wherein the second surface includes a third carriage ramp and a fourth carriage ramp; and the base member includes a third base ramp and a fourth base ramp.

19. The lift assembly of claim 14, comprising a retaining member configured to cover a least a portion of the first surface and retain the first plurality of ball bearings in the carriage member.

20. The lift assembly of claim 14, wherein the retaining member defines an opening that extends about only a portion of the length of the first bearing channel, the opening configured to allow a portion each of the first plurality of ball bearings to extend through the opening.

21. A method of manufacturing a bearing assembly comprising the steps of:
   forming a carriage member, the carriage member including:
      a first surface having a first plane defining a first bearing channel, the first bearing channel configured to receive a first plurality of ball bearings and allow recirculating movement of the plurality of ball bearings in a second plane, the first bearing channel having a variable depth, wherein the first bearing channel having a variable depth is configured to allow the first plurality of ball bearings to extend beyond the first surface at a first portion of the first bearing channel and extend below the first surface at a second portion of the first bearing channel, wherein the first plane and the second plane are substantially parallel;

a second surface opposing the first surface, the second surface including a first carriage ramp and a second carriage ramp;

forming a base member, the base member including a first base ramp, a second base ramp, and a receiving channel; the base member configured such that the first base ramp engages the first carriage ramp and the second base ramp engages the second carriage ramp, wherein the receiving channel is configured to receive an adjustment member; and attaching a planar flexible retaining member to the first surface, the planar retaining member defining an opening that extends about only a portion of the length of the first bearing channel, the opening defining a first width orthogonal to the longitudinal axis of the opening; and after the step of attaching the flexible retaining member, inserting a plurality of ball bearings through the opening, each ball bearing having a diameter greater than the first width.

\* \* \* \* \*

UNITED STATES PATENT AND TRADEMARK OFFICE
CERTIFICATE OF CORRECTION

PATENT NO.       : 9,599,153 B2
APPLICATION NO.  : 14/955612
DATED            : March 21, 2017
INVENTOR(S)      : Stuart Ripley Aldrich It is certified that error appears in the above-identified patent and that said Letters Patent is hereby corrected as shown below:

In the Specification

In Column 10, Line 17, delete "1224A," and insert --122A,-- therefor

Signed and Sealed this
Twenty-fourth Day of April, 2018

Andrei Iancu
*Director of the United States Patent and Trademark Office*